(12) United States Patent
Coulson et al.

(10) Patent No.: US 6,526,399 B1
(45) Date of Patent: Feb. 25, 2003

(54) METHOD AND SYSTEM FOR GROUPING AND DISPLAYING A DATABASE

(75) Inventors: Michael J. Coulson, Kirkland, WA (US); Jay L. Massena, Seattle, WA (US); David A. Wortendyke, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/333,738

(22) Filed: Jun. 15, 1999

(51) Int. Cl.[7] .............................................. G06F 17/30
(52) U.S. Cl. .......................................... 707/1; 707/503
(58) Field of Search ................... 707/1–7, 10, 100–102, 707/503–510, 517, 522–523

(56) References Cited

U.S. PATENT DOCUMENTS

| | | | | |
|---|---|---|---|---|
| 5,418,950 A | * | 5/1995 | Li et al. ...................... | 395/600 |
| 5,463,724 A | * | 10/1995 | Anderson et al. ........... | 395/148 |
| 5,604,854 A | * | 2/1997 | Glassey ...................... | 395/764 |
| 5,752,025 A | * | 5/1998 | Shakib et al. ............... | 395/613 |
| 5,842,218 A | * | 11/1998 | Robinson .................... | 707/102 |
| 5,884,306 A | * | 3/1999 | Bliss et al. .................... | 707/7 |
| 5,893,125 A | * | 4/1999 | Shostak ....................... | 707/511 |
| 5,914,714 A | * | 6/1999 | Brown ........................ | 345/339 |
| 6,104,325 A | * | 8/2000 | Liaw et al. .................... | 341/63 |
| 6,199,080 B1 | * | 3/2001 | Nielsen ........................ | 707/513 |
| 6,243,703 B1 | * | 6/2001 | Couch et al. ................. | 707/10 |
| 6,247,030 B1 | * | 6/2001 | Suzuki ........................ | 707/509 |

OTHER PUBLICATIONS

Using Microsoft Office, Specifal Edition is based on Version 4.2, Publisher: David P. Ewing, 1994, pp. 243–419.*

* cited by examiner

Primary Examiner—James P. Trammell
Assistant Examiner—Mary Wang
(74) Attorney, Agent, or Firm—Merchant & Gould, P.C.; Mark R. Hennings

(57) ABSTRACT

A database grouping and display system that groups a database by row and column in response to a user input. The database grouping and display system displays a raw, ungrouped database and allows a user to manipulate it as desired. The system displays the raw database and any manipulation results within a window of a web browser, thus allowing data analysis to be performed with the use of a common and inexpensive program. A user may group a database in order to group record entries within the database by common data entry. The user may group the record entries by row, by column, or by row and column. Each record entry grouping is referred to as a "metacell." The database grouping and display system may further summarize the contents of each metacell and present a summary result along with the display of the metacell. This summary value is typically invoked for all metacells, but may alternately apply to a single row, column, or metacell, or for the entire document. The display state of the metacells may be toggled between a fully expanded and collapsed state. In the expanded state, all record entries within the metacell are visible, along with any summary values for the metacell. In a collapsed state, only summary values are shown in the metacell. This allows a user to see as much or as little detail for a metacell or range of metacells as desired.

25 Claims, 19 Drawing Sheets

| ShipName ▶ | ShipCountry ▶ | ShipperName ▶ | Salesperson ▶ | ExtendedPri |
|---|---|---|---|---|
| Richter Supermarkt | Switzerland | Federal Shipping | Anne Dodd | $36 |
| Richter Supermarkt | Switzerland | Federal Shipping | Anne Dodd | $1,32 |
| Wellington Importadora | Brazil | United Package | Janet Leverling | $39 |
| Wellington Importadora | Brazil | United Package | Janet Leverling | $12 |
| HILARION-Abastos | Venezuela | Federal Shipping | Margaret Peacock | $87 |
| HILARION-Abastos | Venezuela | Federal Shipping | Margaret Peacock | $8 |
| HILARION-Abastos | Venezuela | Federal Shipping | Margaret Peacock | $15 |
| Ernst Handel | Austria | Speedy Express | Nancy Davolio | $60 |
| Ernst Handel | Austria | Speedy Express | Nancy Davolio | $88 |
| Ernst Handel | Austria | Speedy Express | Nancy Davolio | $12 |
| Centro comercial Moctezuma | Mexico | Federal Shipping | Margaret Peacock | $8 |
| Centro comercial Moctezuma | Mexico | Federal Shipping | Margaret Peacock | $2 |
| Ottilies Käseladen | Germany | Speedy Express | Margaret Peacock | $9 |
| Ottilies Käseladen | Germany | Speedy Express | Margaret Peacock | $78 |
| Ottilies Käseladen | Germany | Speedy Express | Margaret Peacock | $44 |
| Ottilies Käseladen | Germany | Speedy Express | Margaret Peacock | $18 |
| Que Delicia | Brazil | United Package | Margaret Peacock | $16 |
| Que Delicia | Brazil | United Package | Margaret Peacock | $28 |
| Rattlesnake Canyon Grocery | USA | Federal Shipping | Laura Callahan | $16 |
| Rattlesnake Canyon Grocery | USA | Federal Shipping | Laura Callahan | $36 |
| Rattlesnake Canyon Grocery | USA | Federal Shipping | Laura Callahan | $6 |
| Ernst Handel | Austria | Federal Shipping | Anne Dodd | $62 |

Fig. 3.

| ShipName | ShipCountry ▼ | ShipperName ▼ | Salesperson ▼ | ExtendedPrice |
|---|---|---|---|---|
| Vins et alcools Chevalier | France | Federal Shipping | Steve Buchanan | $174. |
| Vins et alcools Chevalier | France | Federal Shipping | Steve Buchanan | $168. |
| ins et alcools Chevalier | France | Federal Shipping | Steve Buchanan | $98. |
| Toms Spezialitäten | Germany | Speedy Express | Michael Suyama | $167. |
| Toms Spezialitäten | Germany | Speedy Express | Michael Suyama | $1,696. |
| Hanari Carnes | Brazil | United Package | Margaret Peacock | $77. |
| Hanari Carnes | Brazil | United Package | Margaret Peacock | $1,261. |
| Hanari Carnes | Brazil | United Package | Margaret Peacock | $214. |
| Victuailles en stock | France | Speedy Express | Janet Leverling | $95. |
| Victuailles en stock | France | Speedy Express | Janet Leverling | $222. |
| Victuailles en stock | France | Speedy Express | Janet Leverling | $336. |
| Suprêmes délices | Belgium | United Package | Margaret Peacock | $2,462. |
| Suprêmes délices | Belgium | United Package | Margaret Peacock | $47. |
| Suprêmes délices | Belgium | United Package | Margaret Peacock | $1,088. |
| Hanari Carnes | Brazil | United Package | Janet Leverling | $200. |
| Hanari Carnes | Brazil | United Package | Janet Leverling | $604. |
| Hanari Carnes | Brazil | United Package | Janet Leverling | $640. |
| Chop-suey Chinese | Switzerland | United Package | Steve Buchanan | $45. |
| Chop-suey Chinese | Switzerland | United Package | Steve Buchanan | $340. |
| Chop-suey Chinese | Switzerland | United Package | Steve Buchanan | $168. |

Fig. 4.

Invoices

Drop Filter Fields Here

| ShipCountry ▼ | ShipName ▼ | Salesperson ▼ | ShipperName ▼ | ExtendedPrice |
|---|---|---|---|---|
| Argentina | Océano Atlántico Ltda. | Janet Leverling | Speedy Express | $22 |
| | Océano Atlántico Ltda. | Janet Leverling | Speedy Express | $9 |
| | Rancho grande | Margaret Peacock | United Package | $14 |
| | Rancho grande | Margaret Peacock | United Package | $29 |
| | Cactus Comidas para llevar | Laura Callahan | United Package | $5 |
| | Cactus Comidas para llevar | Laura Callahan | United Package | $9 |
| | Cactus Comidas para llevar | Laura Callahan | United Package | $7 |
| | Océano Atlántico Ltda. | Robert King | Speedy Express | $11 |
| | Rancho grande | Margaret Peacock | United Package | $5 |
| | Rancho grande | Margaret Peacock | United Package | $37 |
| | Cactus Comidas para llevar | Margaret Peacock | United Package | $28 |
| | Cactus Comidas para llevar | Anne Dodd | Federal Shipping | $1 |
| | Cactus Comidas para llevar | Andrew Fuller | Federal Shipping | $32 |
| | Cactus Comidas para llevar | Andrew Fuller | Federal Shipping | $15 |
| | Rancho grande | Anne Dodd | Speedy Express | $40 |
| Austria | Ernst Handel | Nancy Davolio | Speedy Express | $884. |
| | Ernst Handel | Nancy Davolio | Speedy Express | $122. |
| | Ernst Handel | Anne Dodd | Federal Shipping | $625. |
| | Ernst Handel | Anne Dodd | Federal Shipping | $100. |
| | Ernst Handel | Anne Dodd | Federal Shipping | $931. |

*Fig. 5.*

| ShipCountry ▼ | ShipName | Salesperson ▼ | ExtendedPrices ▼ | ShipName |
|---|---|---|---|---|
| ⊞ Argentina | Cactus Comidas para lievar | Anne Dodd | $12.50 | Océano Atlán |
| | Cactus Comidas para lievar | Andrew Fuller | $322.00 | Océano Atlán |
| | Cactus Comidas para lievar | Andrew Fuller | $155.00 | Océano Atlán |
| | Cactus Comidas para lievar | Robert King | $364.80 | Rancho grand |
| | Cactus Comidas para lievar | Robert King | $280.00 | Rancho grand |
| | Rancho grande | Michael Suyama | $36.00 | Cactus Comid |
| | Rancho grande | Michael Suyama | $40.00 | Cactus Comid |
| | | | | Cactus Comid |
| ⊞ Austria | Ernst Handel | Anne Dodd | $625.50 | Ernst Handel |
| | Ernst Handel | Anne Dodd | $100.80 | Ernst Handel |
| | Ernst Handel | Anne Dodd | $931.50 | Ernst Handel |
| | Ernst Handel | Robert King | $216.00 | Ernst Handel |
| | Piccolo und mehr | Robert King | $161.28 | Ernst Handel |
| | Piccolo und mehr | Robert King | $8,432.00 | Ernst Handel |
| | Piccolo und mehr | Andrew Fuller | $1,440.00 | Ernst Handel |
| | Ernst Handel | Margaret Peacock | $248.12 | Ernst Handel |
| | Ernst Handel | Margaret Peacock | $606.90 | Ernst Handel |
| | Ernst Handel | Laura Callahan | $217.39 | Ernst Handel |
| | Ernst Handel | Laura Callahan | $333.20 | Ernst Handel |

*Fig. 6.*

| ShipperName ▶ | | Speedy Express | |
|---|---|---|---|
| ☐ Federal Shipping | | | |
| ShipName | ExtendedPrice ▶ | ShipName | Ext |
| ShipCountry ▶ | | | |
| ☐ Argentina | | | |
| Cactus Comidas para lievar | $12.50 | Océano Atlántico Ltda. | |
| Cactus Comidas para lievar | $322.00 | Océano Atlántico Ltda. | |
| Cactus Comidas para lievar | $155.00 | Océano Atlántico Ltda. | |
| Cactus Comidas para lievar | $364.80 | Rancho grande | |
| Rancho grande | $280.00 | Rancho grande | |
| Rancho grande | $36.00 | Cactus Comidas para lievar | |
| | $40.00 | Cactus Comidas para lievar | |
| ☐ Austria | | | |
| Ernst Handel | $625.50 | Ernst Handel | |
| Ernst Handel | $100.80 | Ernst Handel | |
| Ernst Handel | $931.50 | Ernst Handel | |
| Ernst Handel | $216.00 | Ernst Handel | |
| Piccolo und mehr | $161.28 | Ernst Handel | |
| Piccolo und mehr | $8,432.00 | Ernst Handel | |
| Piccolo und mehr | $1,440.00 | Ernst Handel | |
| Ernst Handel | $248.12 | Ernst Handel | |
| Ernst Handel | $606.90 | Ernst Handel | |
| Ernst Handel | $217.39 | Ernst Handel | |

| Invoices | | | | |
|---|---|---|---|---|
| Salesperson ▼ | | | | |
| All ▼ | | | | |
| | | ShipperName ▼ | | |
| | | Federal Shipping | Speedy Express | |
| ShipCountry ▼ | ShipName ▼ | ExtendedPrice ▼ | ShipName | Ext |
| Argentina | Cactus Comidas para llevar | $12.50 | Océano Atlántico Ltda. | |
| | Cactus Comidas para llevar | $322.00 | Océano Atlántico Ltda. | |
| | Cactus Comidas para llevar | $155.00 | Océano Atlántico Ltda. | |
| | Cactus Comidas para llevar | $364.80 | Rancho grande | |
| | Rancho grande | $280.00 | Rancho grande | |
| | Rancho grande | $40.00 | Cactus Comidas para llevar | |
| | | | Cactus Comidas para llevar | |
| | Sum of Extended Price | $1,210.30 | Sum of Extended Price | |
| Austria | Ernst Handel | $625.50 | Ernst Handel | |
| | Ernst Handel | $100.80 | Ernst Handel | |
| | Ernst Handel | $931.50 | Ernst Handel | |
| | Piccolo und mehr | $216.00 | Ernst Handel | |
| | Piccolo und mehr | $161.28 | Ernst Handel | |
| | Piccolo und mehr | $8,432.00 | Ernst Handel | |
| | Ernst Handel | $1,440.00 | Ernst Handel | |
| | Ernst Handel | $248.12 | Ernst Handel | |
| | | $606.90 | Ernst Handel | |

Fig. 10.

| ShipperName ▼ | | Federal Shipping | | Speedy Express | | | United |
|---|---|---|---|---|---|---|---|
| | | Sum of ExtendedPrice ▼ | | ShipName ▼ | | Extended Price ▼ | Sum of E |
| ShipCountry ▼ | | | | | | | |
| Argentina | | $1210.30 | | Océano Atlántico Ltda. | | $223.20 | |
| | | | | Océano Atlántico Ltda. | | $96.00 | |
| | | | | Océano Atlántico Ltda. | | $110.00 | |
| | | | | Rancho grande | | $405.00 | |
| | | | | Rancho grande | | $527.00 | |
| | | | | Cactus Comidas para llevar | | $150.00 | |
| | | | | Cactus Comidas para llevar | | $25.00 | |
| | | | | Cactus Comidas para llevar | | $280.00 | |
| | | | | Sum of Extended Price | | $1,816.20 | |
| Austria | | $40,870.78 | | Sum of Extended Price | | $41,004.13 | |
| Belgium | | $11,393.30 | | Sum of Extended Price | | $4,717.56 | |
| Brazil | | $16,514.56 | | Sum of Extended Price | | $35,398.13 | |
| Canada | | $19,598.78 | | Sum of Extended Price | | $5,440.43 | |
| Denmark | | $18,295.30 | | Sum of Extended Price | | $6,573.97 | |
| Finland | | $4,889.94 | | Sum of Extended Price | | $5,996.21 | |
| France | | $28,737.23 | | Sum of Extended Price | | $21,140.18 | |
| Germany | | $53,474.89 | | Sum of Extended Price | | $94,847.15 | |
| Ireland | | $9,934.37 | | Sum of Extended Price | | $7,537.86 | |

| ShipCountry | ShipperName | | |
|---|---|---|---|
| | Federal Shipping | Speedy Express | |
| | ShipName | ShipName | Extended Price |
| Argentina | Cactus Comidas para llevar | Océano Atlántico Ltda. | $12.50 |
| | Cactus Comidas para llevar | Océano Atlántico Ltda. | $322.00 |
| | Cactus Comidas para llevar | Océano Atlántico Ltda. | $155.00 |
| | Cactus Comidas para llevar | Rancho grande | $364.80 |
| | Rancho grande | Rancho grande | $280.00 |
| | Rancho grande | Cactus Comidas para llevar | $36.00 |
| | | Cactus Comidas para llevar | $40.00 |
| | Sum of Extended Price | Sum of Extended Price | $1,210.30 |
| Austria | Sum of Extended Price | Sum of Extended Price | $40,870.78 |
| Belgium | Sum of Extended Price | Sum of Extended Price | $11,393.30 |
| Brazil | Sum of Extended Price | Sum of Extended Price | $16,514.56 |
| Canada | Sum of Extended Price | Sum of Extended Price | $19,598.78 |
| Denmark | Sum of Extended Price | Sum of Extended Price | $18,295.30 |
| Finland | Sum of Extended Price | Sum of Extended Price | $4,889.94 |
| France | Sum of Extended Price | Sum of Extended Price | $28,737.23 |
| Germany | Sum of Extended Price | Sum of Extended Price | $53,474.89 |
| Ireland | Sum of Extended Price | Sum of Extended Price | $9,934.37 |

Fig. 11.

| Invoices | | | | | |
|---|---|---|---|---|---|
| Salesperson ▼ | | | | | |
| All | | | | | |
| | | ShipperName ▼ | | | |
| | | Federal Shipping | | ⊞ Speedy Express | ⊞ United |
| ShipCountry ▼ | ShipName ▼ | Extended Price ▼ | | Sum of Extended Price | Sum of E |
| ⊟ Argentina | Cactus Comidas para llevar | $12.50 | | $1,816.20 | |
| | Cactus Comidas para llevar | $322.00 | | | |
| | Cactus Comidas para llevar | $155.00 | | | |
| | Cactus Comidas para llevar | $364.80 | | | |
| | Cactus Comidas para llevar | $280.00 | | | |
| | Rancho grande | $36.00 | | | |
| | Rancho grande | $40.00 | | | |
| | Sum of Extended Price | $1,210.30 | | | |
| ⊟ Austria | Ernst Handel | $625.50 | | $41,004.13 | |
| | Ernst Handel | $100.80 | | | |
| | Ernst Handel | $931.50 | | | |
| | Ernst Handel | $216.00 | | | |
| | Piccolo und mehr | $161.28 | | | |
| | Piccolo und mehr | $8,432.00 | | | |
| | Piccolo und mehr | $1,440.00 | | | |
| | Ernst Handel | $248.12 | | | |
| | Ernst Handel | $606.90 | | | |
| | Ernst Handel | $217.39 | | | |

| ShipCountry ▼ | ShipperName ▼ | | | Grand |
|---|---|---|---|---|
| | Federal Shipping Sum of Extended Price | Speedy Express Sum of Extended Price | United Package Sum of Extended Price | Sum of E |
| Argentina | $1,210.30 | $1,816.20 | $5,062.60 | |
| Austria | $40,870.78 | $41,004.13 | $46,128.93 | |
| Belgium | $11,393.30 | $4,717.56 | $17,713.99 | |
| Brazil | $16,514.56 | $35,398.13 | $55,013.08 | |
| Canada | $19,598.78 | $5,440.43 | $25,157.09 | |
| Denmark | $18,295.30 | $6,573.97 | $7,791.75 | |
| Finland | $4,889.94 | $5,996.21 | $7,954.00 | |
| France | $28,737.23 | $21,140.18 | $31,480.90 | |
| Germany | $53,474.89 | $94,847.15 | $81,962.58 | |
| Ireland | $9,934.37 | $7,537.86 | $32,507.67 | |
| Italy | $4,262.43 | $7,782.13 | $3,725.60 | |
| Mexico | $10,069.52 | $3,985.96 | $9,526.60 | |
| Norway | $500.00 | $200.00 | $5,035.15 | |
| Poland | $1,446.35 | $591.60 | $1,494.00 | |
| Portugal | $5,438.50 | $947.57 | $5,086.30 | |
| Spain | $6,544.10 | $2,837.10 | $8,602.00 | |
| Sweden | $13,704.86 | $14,858.91 | $25,931.37 | |
| Switzerland | $13,625.28 | $6,099.56 | $11,967.82 | |

METHOD AND SYSTEM FOR GROUPING AND DISPLAYING A DATABASE

TECHNICAL FIELD

The invention relates generally to the field of database systems, and, more particularly, to a database grouping and display system for a personal computer.

BACKGROUND

Data analysis has long played an essential role in corporate management. Without the ability to adequately analyze, summarize, and manipulate raw data the efficiency of a corporation suffers. Traditionally, a dedicated application program performs data analysis and reporting.

Many of these database application programs are complex and unwieldy to use. A user often needs specialized knowledge to perform even basic tasks, let alone sophisticated analysis. Further, a simple action such as grouping a database or creating a table from raw data may necessitate lengthy user commands, such as designating the table axes, selecting the group criteria, indicating the source data, and/or physically moving database record entries to obtain an adequately grouped result.

Prior art solutions addressed database grouping through the use of simplified interfaces known as program "wizards." These wizards greatly simplify the database grouping process by minimizing the number of options and/or inputs necessitated from a user. However, because designers of these wizards presume that each wizard will be used to manipulate a particular type of data, the simplified interfaces may be inflexible and lead to inaccurate tables or cross-sections of data when a user applies the wizard to different types of data.

Database applications commonly may create summary values for data tables. Typically, a data page other than the detailed data page displays this summary value. Presenting summary values on separate display surfaces unnecessarily frustrates the user as he is forced to swap back and forth between multiple display surfaces for a complete data analysis.

Additionally, database application programs are often prohibitively expensive. With prices in the hundreds or thousands of dollars per copy, and tens of thousands of dollars for a corporate license, data analysis and reporting may be prohibitively expensive. This is even more true in the case of a small or start-up business.

Thus, there is a general need in the art for a data analysis tool that quickly and efficiently groups data in a simplified manner that is easily apprehended by a casual or novice user. There is a further need in the art for a simplified data analysis tool that accurately reports results in a manner desired by the user. There is also a need for a data analysis tool that presents summary values within the same display surface as the raw data. Inexpensive data analysis tools that are affordable by individuals or small companies are also desirable.

SUMMARY OF THE INVENTION

Generally stated, the invention is a database grouping and display system for a personal computer. The database grouping and display system displays a raw, ungrouped database and allows a user to manipulate it as desired. The system displays the raw database and any manipulation results within a window of a web browser, thus allowing data analysis to be performed with the use of a common and inexpensive program. A user may group record entries within a database by common data entry. The user may group the record entries by row, by column, or by row and column. Each record entry grouping is referred to as a "metacell." The database grouping and display system may further summarize the contents of each metacell and present a summary result along with the display of the metacell. This summary value may be invoked for a single row, column, or metacell, or for the entire document.

Further, the display state of the metacells may be toggled between a fully expanded and collapsed state. In the expanded state, all record entries within the metacell are visible, along with any summary values for the metacell. In a collapsed state, only summary values are shown in the metacell. This allows a user to see as much or as little detail for a metacell or range of metacells as desired.

All the database grouping and summary commands are implemented in a graphical user interface (GUI). This GUI system, combined with common input devices such as a mouse and keyboard, ensure that the learning curve for use of the present invention is minimal. Thus, even a novice or casual user may quickly and easily understand and apply the present invention to a database.

The present invention meets these needs in a database grouping and display system that orders raw data according to a user's desires in response to simple and efficient input commands. The system retrieves a database file including a number of headings and record entries organized under the headings. The record entries are further comprised of a plurality of data entries organized under the plurality of headings. The present invention displays the database on a display device, along with at least one group drop area. In response to a command associating one of the headings with the group drop area, the heading becomes a group heading and the data entries associated with the group heading become group subheadings. The present invention then groups the database into groups of record entries called metacells and organizes the metacells according to group subheading. A metacell contains all record entries that contain a data entry corresponding to the group subheading with which the metacell is associated. Once the database is grouped, the present invention displays the metacells on the display device. A database may be grouped by row, column, or both. This allows a user to specify the fields upon which to group the database, and control the output of the group operation.

The invention may further perform various summary value operations on a metacell, including summing the values of numerical data entries within the metacell, counting the number of data entries within the metacell, displaying the minimum value of all numerical data entries within the metacell, and displaying the maximum value of all numerical entries within the metacell. The metacell associated with the summary value operation displays the resulting summary value. This ensures that the raw data underlying the summary value and the summary value itself are displayed on the same page, rather than forcing a user to swap back and forth between two display surfaces.

That the invention improves over the drawbacks of prior database grouping and display systems and accomplishes the advantages described above will become apparent from the following detailed description of the embodiments and the appended drawings and claims.

BRIEF DESCRIPTION OF THE FIGURES

FIG. 3 is a screen display illustrating a flat list displayed in a single display surface.

FIG. 4 is a screen display illustrating a set of drop areas.

FIG. 5 is a screen display illustrating a row grouped database.

FIG. 6 is a screen display illustrating a row and column grouped database.

FIG. 7 is a screen display illustrating a filter drop area.

FIG. 9 is a screen display illustrating a summary value.

FIG. 10 is a screen display illustrating an expanded metacell.

FIG. 11 is a screen display illustrating a row of expanded metacells.

FIG. 12 is a screen display illustrating a column of expanded metacells.

FIG. 13 is a screen display illustrating a database of collapsed metacells.

DETAILED DESCRIPTION OF EMBODIMENTS

Figure 1:
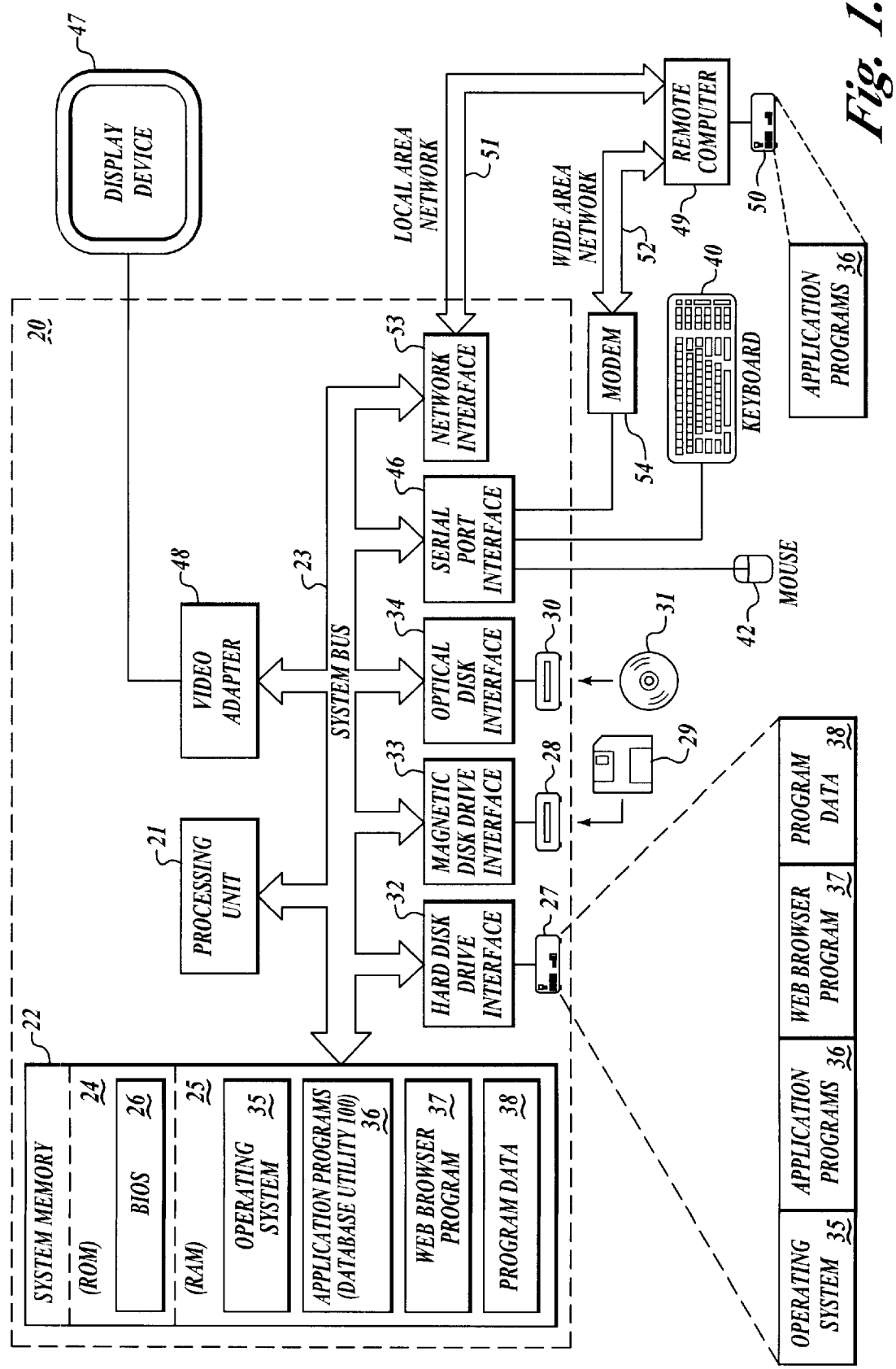
FIG. 1 is a block diagram of a personal computer that provides an exemplary operating environment for an exemplary embodiment of the present invention.

The present invention may be embodied in a database utility that groups and displays a database consisting of a plurality of record entries, including headings and data entries organized under the headings. The database is grouped according to group criteria chosen by a user. A database is displayed on a display surface along with at least one drop area. The database may be grouped through the use of the drop areas to create a database grouped into various metacells in which record entries are grouped according to common data entries. The display surface is typically an active window of a web browser displaying the database as an HTML document, but the display surface may alternately be a window of any application program operable for displaying and manipulating the database in any file format compatible with the application program.

In an embodiment, the display surface includes a row drop area and column drop area. The row drop area is a display item typically located to the left of the database on the display surface and is column-shaped, while the column drop area is a display item typically located above the database and is row-shaped. Alternate embodiments may use more drop areas, or a single drop area. Alternate embodiments may also change the shape of the drop area display items to fit various database displays; for example, the drop areas may be round, square, triangular, or a custom shape as needed, and may be located adjacent to other portions of the database display, or may be located in a pull-down menu or in some other type of user interface configuration. For example, the drop areas may be located in separate windows on the display screen, or may be represented by icons or buttons rather than blank fields.

The database typically includes a set of record entries containing at least one data entry and at least one heading. Each heading may also include one or more subheadings. Initially, the database utility displayed the database as an ungrouped list on a display device. The display device is typically a monitor, but may alternately be a printer, flatscreen LCD display, television, and so on.

The database utility may group the database by row. In order to initiate a row group, a user selects a heading from the database, initiates a drag-and-drop command, dropping the heading on the row display item. The database utility then displays the heading along the y-axis of the database, with each associated subheading displayed beneath the heading. In response to the drag-and-drop command, the database utility groups the database according to the heading. That is, the database utility displays all record entries with data entries corresponding to each subheading in a group, or metacell, adjacent to the subheading display. Multiple headings may be used as group criteria, resulting in a more finely grouped database. In the event that a user initiates multiple row groupings, the database utility displays each heading and set of subheadings to the right of the last heading/subheading used to perform a group. This is commonly referred to as "nesting" the group fields.

Similarly, the database utility may group the database by column as well as by row. The user performs a column group by selecting a heading, initiating a drag-and-drop command dropping the heading on a column group display item. This results in the database utility displaying the heading along the x-axis of the database, with subheadings displayed beneath the heading. As with a row group, the database utility displays all record entries corresponding to a subheading together in a metacell located adjacent to the heading. The user may initiate multiple column groups results similar to those detailed above.

Further, the database utility may group a database may be grouped by both row and column, resulting in a grid of dual-grouped metacells. A database grouped by both row and column places record entries in metacells according to data entries associated with a row subheading and data entries associated with a column subheading. These multiple grouping options allow a user to easily and quickly customize a database without the trouble of personally manipulating each record entry or invoking a separate table to organize data as desired.

The database utility may allow summary values for metacells to be created. In order to create a summary value, a user initiates a summary operation command for a specific heading. In response to the command, the database utility examines the record entries in the metacell and carries out the summary operation. Typically, the database utility displays the summary operation result along the bottom edge of the metacells associated with the chosen heading. However, the operation result may be displayed elsewhere, such as in a dedicated metacell, a pop-up menu, at another position within the metacells, in a dedicated window, and so on. The summary operation carried out is one of four types: summing numerical values of record entries in a metacell, counting the number of record entries, listing the minimum value of all numerical record entries, or displaying the maximum value of all numerical entries within a metacell. Alternative embodiments may employ additional summary operations, including but not limited to averaging numerical record entries within a metacell, performing a standard deviation analysis, finding the mean of the record entries within a metacell, and others that will occur to those skilled in the art.

Once the database utility generates and displays the summary operation, the utility may toggle the display state of a metacell displaying an operation result. A user changes the display state of a metacell through the use of a "change state" button or menu command. Clicking or otherwise depressing the change state button initiates a change state command, which in turn instructs the database utility to alter the display state of the selected metacell, row of metacells, or column of metacells. In an expanded display state, a metacell displays both the record entries within the metacell and a summary value. In a collapsed state, the database utility displays only the summary value. Alternate embodiments of the invention may collapse a metacell to show a summary value along with a limited number of record entries, or collapse a metacell to a predetermined or user-determined size.

Although a user may initiate a metacell change state command, alternate embodiments may employ other means to initiate the command in other ways. For example, a subroutine may initiate a metacell change state command, as may another program in response to a trigger condition, such as the contents of a metacell exceeding the display area allotted to the display surface. Further, a user may employ a variety of input devices to initiate a change state command or any other user command referred to herein. Exemplary input devices include but are not limited to a keyboard, mouse, joystick, light pen, pointing device, trackball, microphone, and so on. It should be understood that the change state command triggers the metacell change state, regardless of the manner or method employed to initiate the command.

Row and column subheadings each contain a change state button. These may appear as icons located on the left side of the subheading, but alternately may appear as drop areas, pull-down or popup menus, hotboxes, separate windows, and so on in alternate embodiments without departing from the spirit of the invention. When a row or column of metacells is in an expanded state, the change state button appears as a minus symbol. Clicking, depressing, or otherwise interacting with the change state button while the row of metacells is expanded instructs the database utility to collapse the row of metacells, displaying the summary value and hiding the record entries. In the event that the database utility displays a row of metacells in a collapsed state, the change state button appears as a plus symbol. When a user wishes to view the detailed record entries associated with a summary value, he clicks the change state button and the database utility expands the row of metacells to display detailed record entries.

Similarly, the database utility may expand a single metacell. The change state command is typically initiated for a single metacell by accessing a pull-down menu. Right-clicking on a metacell shows a pull-down menu containing the change state command. Selecting the change state command instructs the system to toggle the display state of the particular metacell for which the command was invoked, with results similar to those described above. Thus, a user may not only create summary data for a metacell or range of metacells, but may also view the summary data on the same display surface as the detailed record data.

Throughout this application, the term "user" is repeatedly used. It should be understood that a "user" refers not only to a person using the present invention, but also to a program, application, operating system, function call, or any other entity that may make use of the present invention. Thus, an operating system that manipulates or otherwise employs the present invention is classified as a user.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as a database, a web browser program 37, and program data 38. These program modules include a database utility 100 configured for implementing an embodiment of the present invention. A user may enter commands and information into the personal computer 20 through conventional input devices such as a keyboard 40, and pointing device such as a mouse 42. Other input devices 40 (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display device 47, such as a display screen, is also connected to the system bus 23 via an interface, such as a video adapter 48. In addition to the display device 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

Configuration of the Database Grouping and Display System

Figure 2:
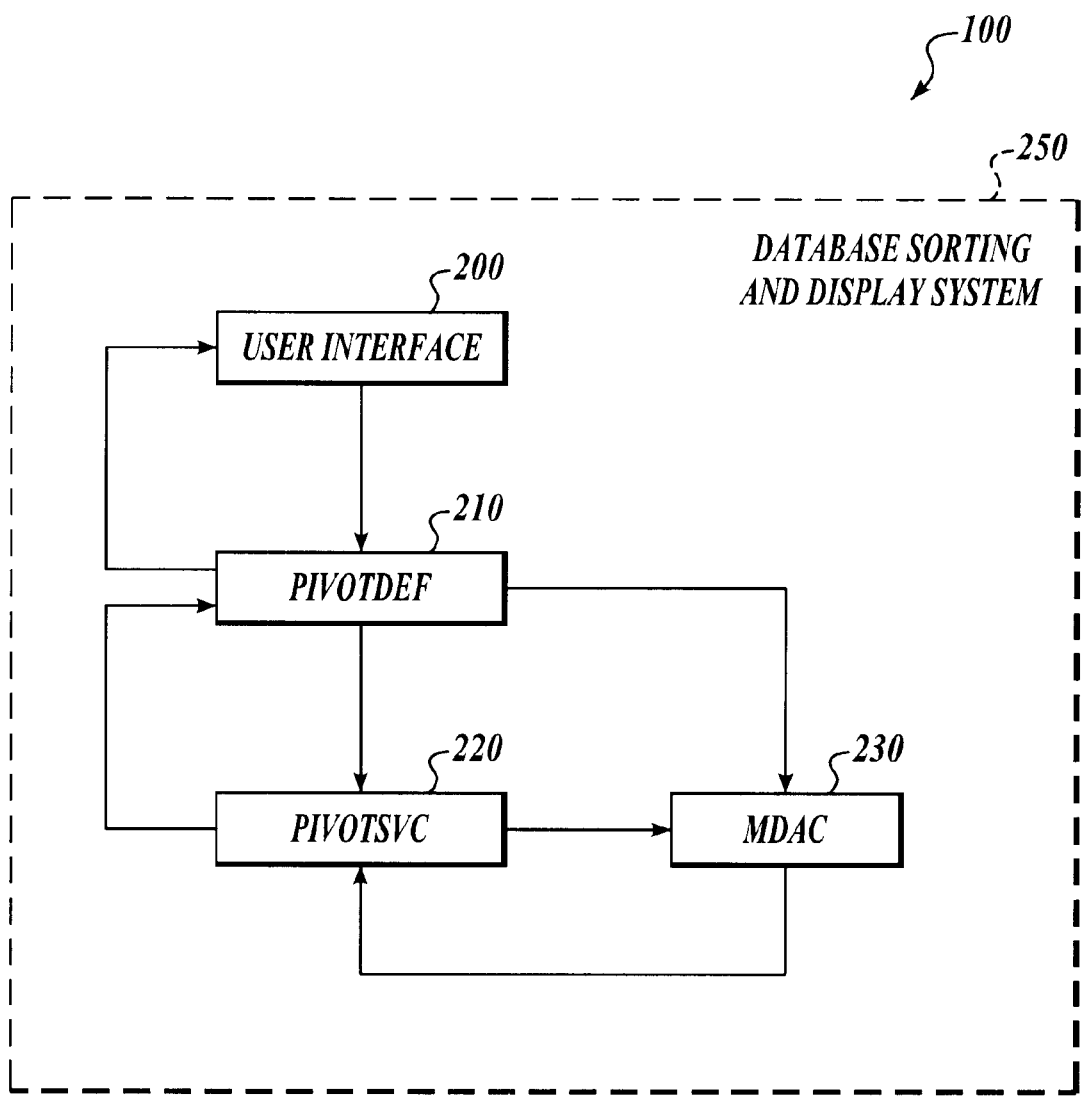
FIG. 2 is a block diagram showing the software architecture of a database grouping and displaying system.

FIG. 2 is a block diagram showing the database utility 100, which reads in a database, transforms the database into a flat list, and groups and displays the flat list according to selected filter fields. The database utility 100 includes a user interface module 200, a PivotDefinition (PivotDef) module 210, a PivotService (PivotSvc) module 220, and a Data Access Component (MDAC) module.

The user interface module 200 interprets user input signals and communicates with the PivotDef module 210. The user interface module 200 displays the database, receives input signals, and generally serves as an intermediary between the user and the PivotDef module 210.

The PivotDef module 210 accepts data passed from the user interface module 200 and the MDAC module 230. The PivotDef module generally performs grouping operations on a database, as well as translating data into and from a format compatible with the MDAC module 230.

The PivotSvc module 220 sums and totals the record entries 310, data entries 340, and associated elements of the database 350. The PivotSvc module 220 interacts with the MDAC module 230 and the PivotDef module 210.

User Interface for the Database Grouping and Display System

FIG. 3 depicts a display surface 300 for the database utility 100. The user interface module 200 controls the display surface 300, and displays the surface on the display device 47. The user interface module 200 further draws a database 350 as a flat list 360 on the display surface 300. The database 350 comprises a plurality of record entries 310 and headings 320. Each record entry comprises at least one data entry 340, displayed under the heading 320 associated with the data entry. For example, FIG. 3 shows a flat list 360 for the "Invoices" database 350. One of the record entries 310 within the "Invoices" database 350 is shown on the first line of the flat list 360 of FIG. 3, while "Anne Dodd" is a data entry 340 within the first record entry, associated with the Salesperson heading 320.

A user of the database utility 100 may select and manipulate record entries 310, headings 320, or data entries 340 through the use of a cursor 330.

FIGS. 4 and 5 depict the row grouping process and results. FIG. 4 shows a display surface 300 incorporating a row drop area 410, column drop area 420, and filter drop area 440 in accordance with the present invention. The user turns the row drop area 410 and column drop area 420 on or off through the use of a pull-down menu or other control (not shown.)

In order to group a database 350 by row, the user selects a heading 320 with the cursor 330. The logic of the row group operation routine is discussed later with respect to FIG. 17. The database utility 100 shades the data entries 340 associated with the heading 320, and the heading itself, to indicate to the user which heading has been selected. The user then performs a drag-and-drop operation on the selected heading 430, dropping the selected heading on the row drop area 410. As the cursor moves over the row drop area, its shape changes to mimic the shape of the flat list 360 when the row drop area, column drop area 420, and filter drop area 440 are shown. The database utility 100 highlights the portion of the cursor corresponding to the drop area over which the cursor hover to provide user feedback indicating where the heading will be placed if the user drops the heading. In the example of FIG. 4, the ShipCountry heading 320 is selected.

Once the user drops the heading 320 in the row drop area 410, the database utility 100 redraws the database 350 on the display surface 300, showing the record entries 310 grouped by row. Continuing with the example begun in FIG. 4, FIG. 5 shows a database 350 that has been grouped by row with respect to the ShipCountry heading 320.

Since the ShipCountry field is the basis for the row group performed by the database utility 100, it is removed as a heading 320 and shown as a row group heading 500. The database utility 100 displays the data entries 340 associated with the ShipCountry row group heading 500 as row group subheadings 510. For example, "Argentina" comprises a data entry 340 beneath the ShipCountry heading 320. On FIG. 5, after performing a row group, the ShipCountry field is displayed as the ShipCountry row group heading 500 and "Argentina" as a row group subheading. Each row group subheading 510 contains the name of the associated data entry 240 and a change state button 520. The change state button will be more fully discussed with respect to FIGS. 8–14.

Further, the database utility 100 may rearrange the record entries 310 comprising the database 350 to group record entries by common data entries 240 under the corresponding row group subheading 510 and redisplayed on the display surface 300. This allows the user to group record entries 310 quickly and easily according to individual preferences. The details of the row group routine are more fully discussed with respect to FIG. 16.

The database utility 100 may also group a database 350 by column. The process for column grouping mirrors that of row grouping. The logic of the column group routine will be discussed in greater detail with respect to FIG. 17. Returning to FIG. 4, a user initiates a column group by selecting a heading 320 and performing a drag-and-drop operation on the heading, dropping it in the column drop area 440. This instructs the database utility 100 to order the record entries 310 in the database 350 according to the presence or absence of specific data entries 340 associated with the selected heading 320 in each record entry.

FIG. 6 displays a database 350 grouped by column. The procedure for performing a column group resembles that for performing a row group. First, a user selects a heading 320 with the cursor 330, then drags the heading to the column drop area 420. Once the heading 320 has been placed in the column drop area 420, the database utility 100 removes the heading from the flat list 360 and redraws the heading as a column heading 600. The system 250 places the data entries 340 associated with the column heading 600 beneath the column heading, and orders the record entries 310 comprising the database 350 accordingly. Thus, all record entries with data entries 340 corresponding to the column subheadings 610 are grouped together beneath the column subheadings.

The database utility 100 may group a database 350 in order to group data in separate display surfaces 300. This is done through the use of the filter drop area 440, as shown in FIG. 7. In order to filter data in this manner, a user selects a heading 320, drags it to the filter drop area 440, and drops it therein. The database utility 100 generates a separate display surface 300 for each data entry 340 in the heading 320, and each data entry becomes a discrete filter subheading 710. A user may then switch between display surfaces 300 to see all data associated with the filter subheading 710 chosen, or continue to view an aggregate of all filter subheadings 710 by choosing the "All" filter subheading. FIG. 7 displays a database 350 in which a filter field 700 and the "All" filter subheading 710 are selected.

A set of record entries 310 grouped following either a row or column group are displayed within a "metacell." A metacell may be thought of as a display surface for grouped record entries 310. A separate metacell exists for each intersection of a row group subheading 510 and column group subheading 610. An example will be used to illustrate the metacell concept.

Turning briefly to FIG. 10, an example of a metacell may be seen. A database 350 is grouped by row and by column, or a dual-grouped database. Metacell 1000 is formed by the intersection of the column beneath the "Speedy Express" column group subheading 610a and the "Argentina" row group subheading 510a. The metacell 1000 contains all record entries 310 whose ShipCountry data entry 340 is "Argentina" and whose ShipperName data entry is "Speedy Express." Thus, twenty full metacells 1000 are shown on FIG. 11: one for the intersection of "Federal Shipping" and "Argentina," one for the intersection of "Federal Shipping" and "Austria," and so on. If a database 350 has been row grouped only, then one metacell 1000 exists for each row group subheading 510. Similarly, where a database 350 has been column grouped but not row grouped, one metacell 1000 exists for each column group subheading 610. For example, in FIG. 5 two metacells 1000 are displayed: one for the row group subheading 510 "Argentina", and one for the row group subheading "Austria."

Figure 8:
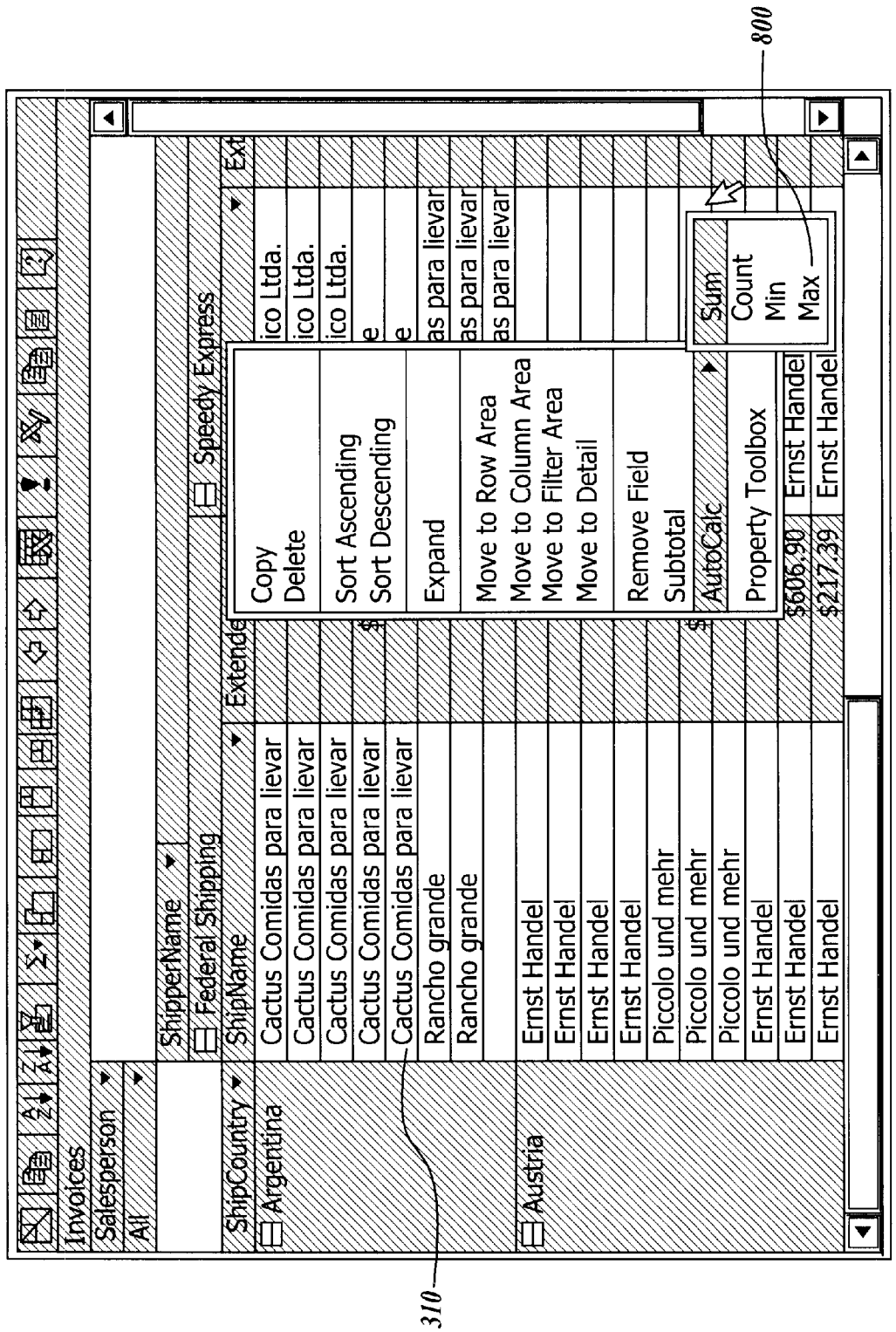
FIG. 8 is a screen display illustrating a summary operation command menu.

Returning to FIG. 8, the database utility 100 may operate on the record entries 310 within each metacell 1000 in various ways. FIG. 8 displays a pull-down menu comprising a variety of summary value command items 800 in accordance with the present invention. A user employs these command items 800 to initiate a summary value operation of the type desired. The logic of the summary value operation routine is discussed later with respect to FIG. 18. The database utility 100 recognizes four summary value commands 800: sum, count, minimum ("min"), and maximum ("max"). A user invokes each summary value command 800 for a header 320. The summary value operation is carried out for all metacells 1000 corresponding to the heading 320. Alternately, the user may employ the command for an entire row, column, or a single metacell. The sum command adds the numerical value of all numerical data entries 340 within the metacell 1000, and produces a total. The count command counts the total number of record entries 310 within the metacell. The min command displays the numerical minimum of all data entries 340 within the metacell 1000, while the max command displays the numerical maximum of all data entries within the metacell.

FIG. 9 displays a summary value 900 for the upper-left metacell 1000. That is, the sum of all numerical data entries 340 within the metacell 1000 is $1,210.00. The summary value 900 is typically displayed at the bottom of the associated metacell 1000.

The database utility 100 may display metacells 1000 in an expanded or contracted state. When expanded, a metacell 1000 displays all data entries 340 within the metacell as well as any summary value 900. The "Speedy Express"/ "Argentina" metacell 1000 shown in FIG. 10 is expanded. When collapsed, a metacell shows only the summary value of the metacell. For example, the "Speedy Express"/ "Austria" metacell shown in FIG. 10 is collapsed. A user expands a single metacell through the use of a pull-down menu command (not shown.) Alternately, a user may expand the row of metacells 1000 corresponding to a row group subheading 510 through the use of the change state button 520 associated with the row group subheading for which the metacells are to be expanded. FIG. 11 displays an example of an expanded row of metacells corresponding to the "Argentina" row group subheading 520. When a row of metacells 1000 is in an expanded state, the change state button contains a minus symbol. When a row of metacells is collapsed, the change state button 520 contains a plus symbol. Similarly, a column of metacells 1000 may be expanded through the use of the change state button 520 associated with the column group subheading 620 for which all data entries 340 are desired. FIG. 12 illustrates an example of an expanded column of metacells. An example of a database 350 wherein all metacells 1000 are collapsed, showing only summary values 900, is shown in FIG. 13. The metacell state change routine is discussed with respect to FIG. 19.

Operation of the Database Grouping and Display System

Throughout the following description of FIGS. 14–18, reference will occasionally be made to the functional block diagram of the database utility 100 shown on FIG. 2.

Figure 14:
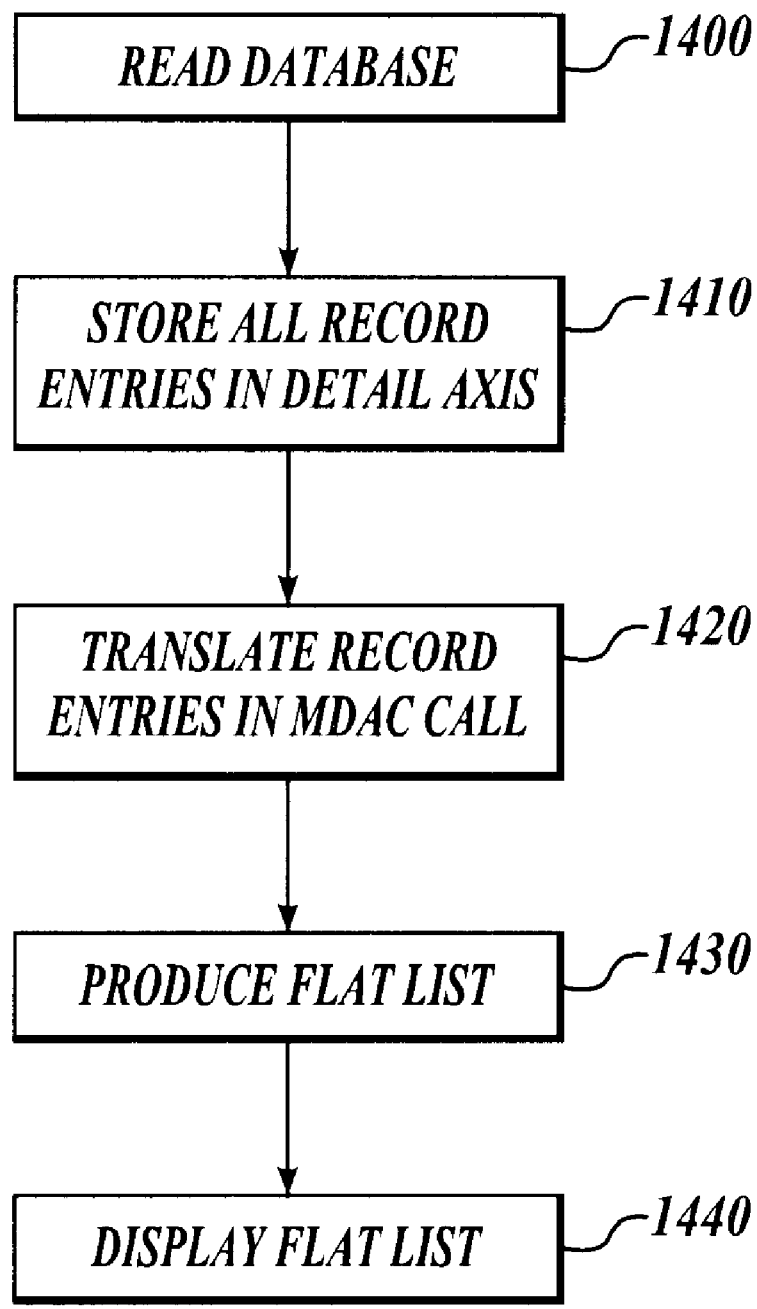
FIG. 14 is a logic flow diagram illustrating a method for initially displaying a database.

FIG. 14 displays a flowchart detailing the steps executed when reading and displaying a database. First, in step 1400 the PivotDef module 210 reads the database into system memory 22 from long-term storage. Next, in step 1410 the PivotDef module 210 stores all record entries 310 in a single metacell 300. Proceeding to step 1420, the user interface module 200 instructs the PivotDef module to translate the database 350 stored in the metacell into an MDAC module 230 compatible format. As part of step 1420, the PivotDef module 210 passes the translated database 350 to the MDAC module 230. In step 1430, the MDAC module 230 produces an ungrouped flat list, as shown in FIG. 3. The MDAC module 230 passes the flat list to the PivotDef module 210 in step 1440, which in turn relays the list to the user interface module 200 in step 1450. Finally, in step 1460 the database 300 is displayed as a flat list on the display device 47, as shown in FIG. 3.

Once a database has been displayed as a flat list on a display device 47, it may be grouped by row and column as detailed with respect to FIGS. 3–7, or summary values 900 may be computed for a single metacell or group of metacells as discussed with respect to FIGS. 8–13. FIGS. 15–18 depict a flowchart detailing these operations.

Figure 15:
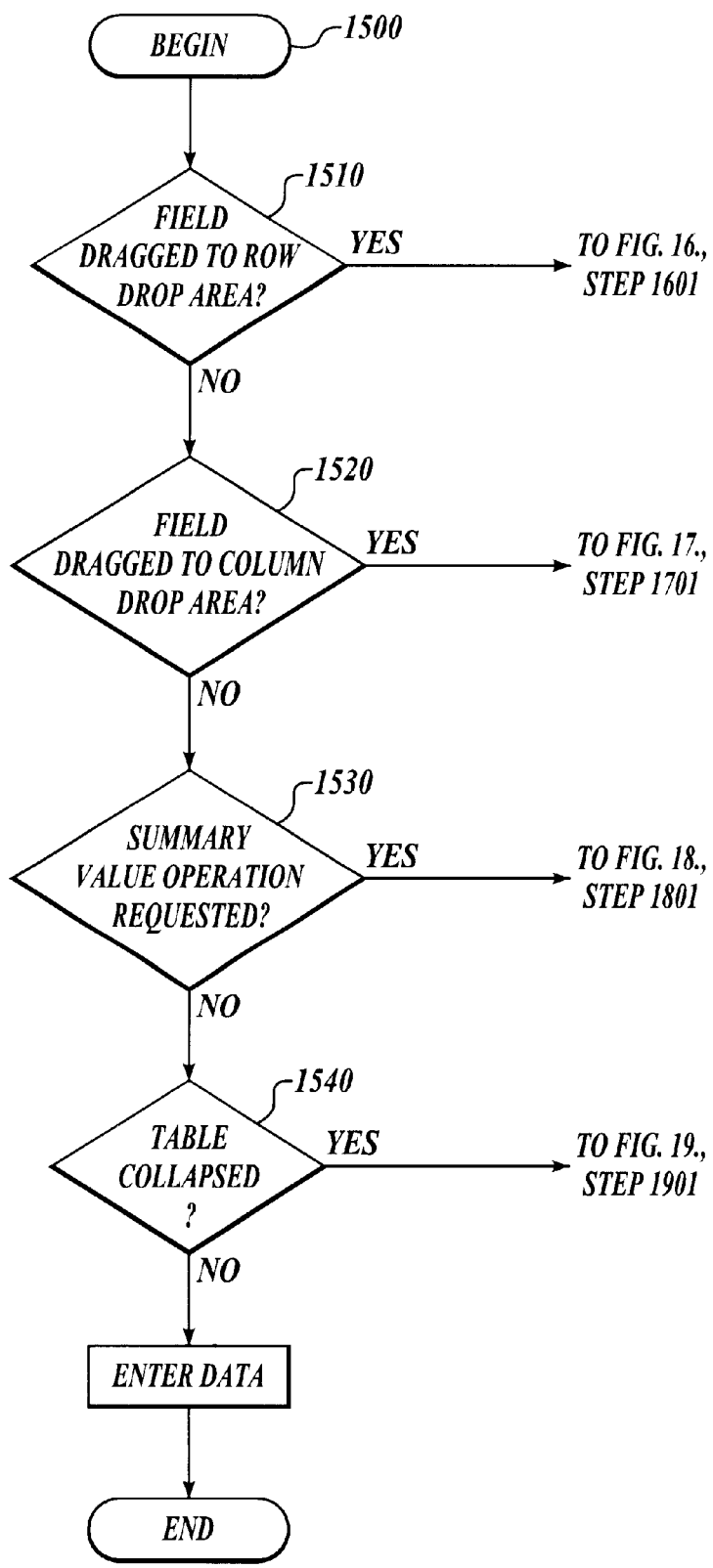
FIG. 15 is a logic flow diagram illustrating a method for updating a database.

Beginning with FIG. 15, database utility 100 starts in an initial "begin" state 1500. In response to an input signal, the system enters steps 1510 and the user interface module 200 determines whether the input signal indicates that a heading is dragged to a row drop area. If the determination is positive, the "YES" branch is followed to step 1601 of FIG. 16. If the determination is negative, the "NO" branch is followed to step 1520.

In step 1520, the database utility 100 determines whether the input signal comprises dragging a heading to a column drop area. If a heading was dragged to a column drop area, routine 1700 is entered. Routine 1700 is described below with reference to FIG. 17. Otherwise, step 1530 follows step 1520, and the user interface module 200 must determine whether the input signal requested a summary value operation. If so, then routine 1800 is executed. Routine 1800 is more filly detailed with respect to FIG. 18 below.

However, if the "NO" branch is followed from step 1530, then step 1540 is entered. In step 1540, the user interface module 200 determines if the input signal is a metacell change state command. In the event that the user interface module 200 decides that the input signal comprises a change state command, the system proceeds to step 1901 of FIG. 19. Otherwise, the input signal comprises a data entry and step 1550 is accessed, in which the database utility 100 enters the data into a selected metacell. After the data is entered, end step 1560 terminates the database utility 100 logic.

Operation of the Row Group Routine

Figure 16:
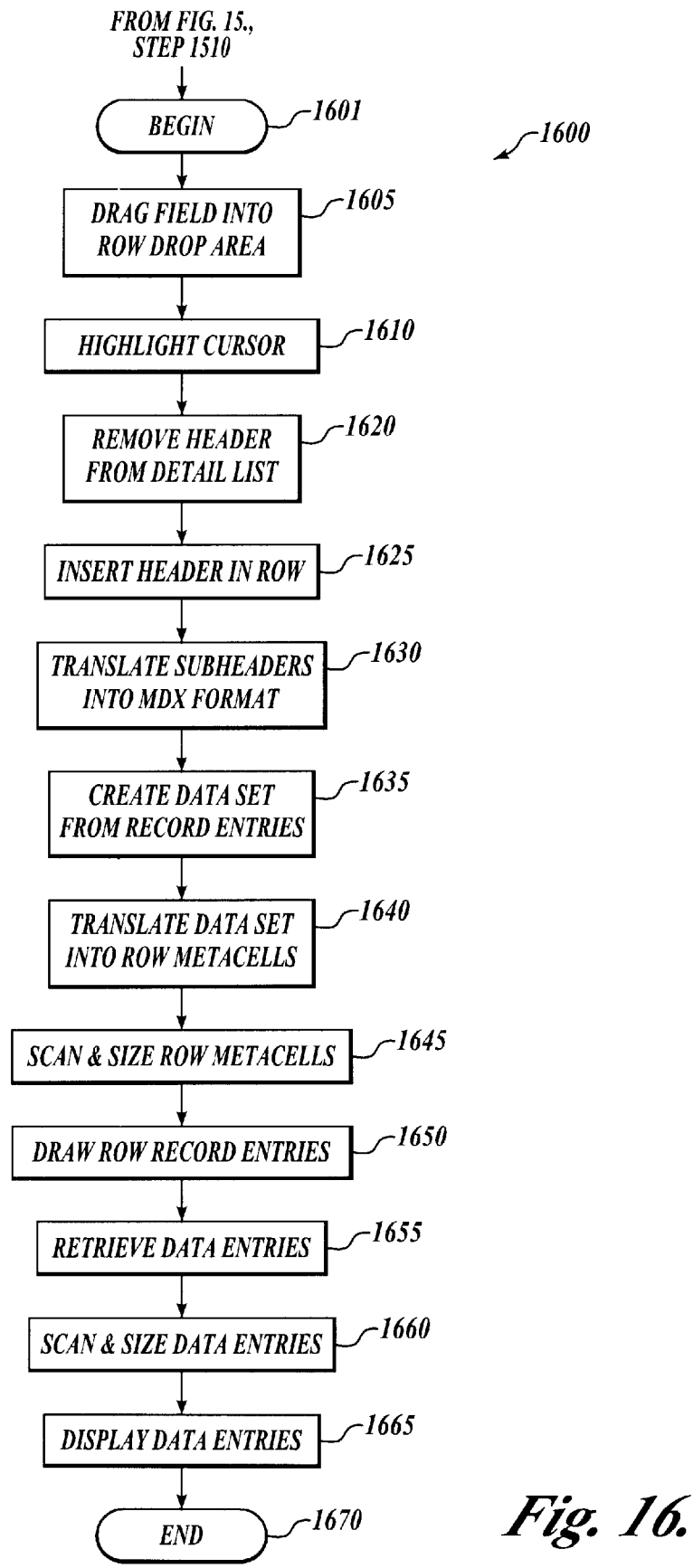
FIG. 16 is a continuation of a logic flow diagram illustrating a method for updating a database.

FIG. 16 depicts the row group routine 1600. The row group routine 1600 starts with "begin" state 1601, accessed from the "YES" branch of FIG. 15, step 1510. From the "begin" state 1601, step 1605 is entered. In step 1605, the user interface module 200 updates the display device 47 to reflect the heading drag-and-drop operation initiated by the user.

Next, the user interface module 200 changes the shape of the cursor 330 in step 1610 to provide additional feedback to the user that the heading 320 will be added to the row group area 410, as described with respect to FIG. 4. Following step 1610, step 1620 removes the heading 320 from the flat list display 360 of the database 350.

Next, step 1625 is entered. In step 1625, the user interface module 220 instructs the PivotDef module 230 to insert the heading 320 and its subheadings into the row drop area 410, thus defining the number of metacells that will be created. One metacell is created for each subheading. In the event that the database has been grouped by column prior to the row group operation, one metacell is created for each intersection of a column subheading and row subheading.

Once the PivotDef module 230 receives the request to insert the heading 320 and subheadings into the row drop area 410, it translates the subheadings of the heading 320 chosen for the row group operation into a format compatible with the MDAC module 230. In an embodiment, this is the MDX, or Microsoft Database Executable, format. The PivotDef module 230 then executes the user interface module 200 request by passing the subheadings to the MDAC module 230.

Once the MDAC module 230 has received the subheadings, it creates a data set in step 1635. The MDAC module 230 creates a data set by scanning the record entries 310 for the presence or absence of data entries 340 corresponding to the heading 320 that was moved to the row drop area 400 in step 1605. Record entries 310 containing identical data entries 340 corresponding to the moved heading 320 are grouped together. The resulting set of grouped record entries 310 constitutes the data set produced by the MDAC module 230. Once step 1635 is completed, the MDAC module 230 initiates step 1640.

In step 1640 of the row group routine 1600, the MDAC module 230 passes the data set created in step 1635 to the PivotDef module 210. The PivotDef module 210 translates the data set back into record entries 310, now grouped by row according to the heading 320 placed in the row drop area 410. Once translated, step 1645 is entered and the row record entries 310 are passed to the user interface module 200, which scans and sizes them. The user interface module performs this operation on the record entries 310 in order to determine their relative dimensions and allocate adequate space on the display device 47 to accommodate each record entry.

Once the user interface module 200 sizes the record entries 310 located within each metacell, the database utility 100 executes step 1650. In step 1650, the user interface module 200 displays the record entries 310 comprising each metacell on the display device 47. Once the user interface module displays the record entries 310, it must display the data entries 340 comprising the record entries. In step 1655, the user interface module 200 retrieves the data entries 340 for each record entry 310. The data entries are then scanned and sized in step 1660 by the user interface module in a manner similar to the record entry sizing of step 1640. Once properly sized, the user interface module 200 executes step 1665 and displays the data entries 340 for each record entry 310. Finally, the database utility 100 halts operation in "end" state 1670.

Operation of the Column Group Routine

Figure 17:
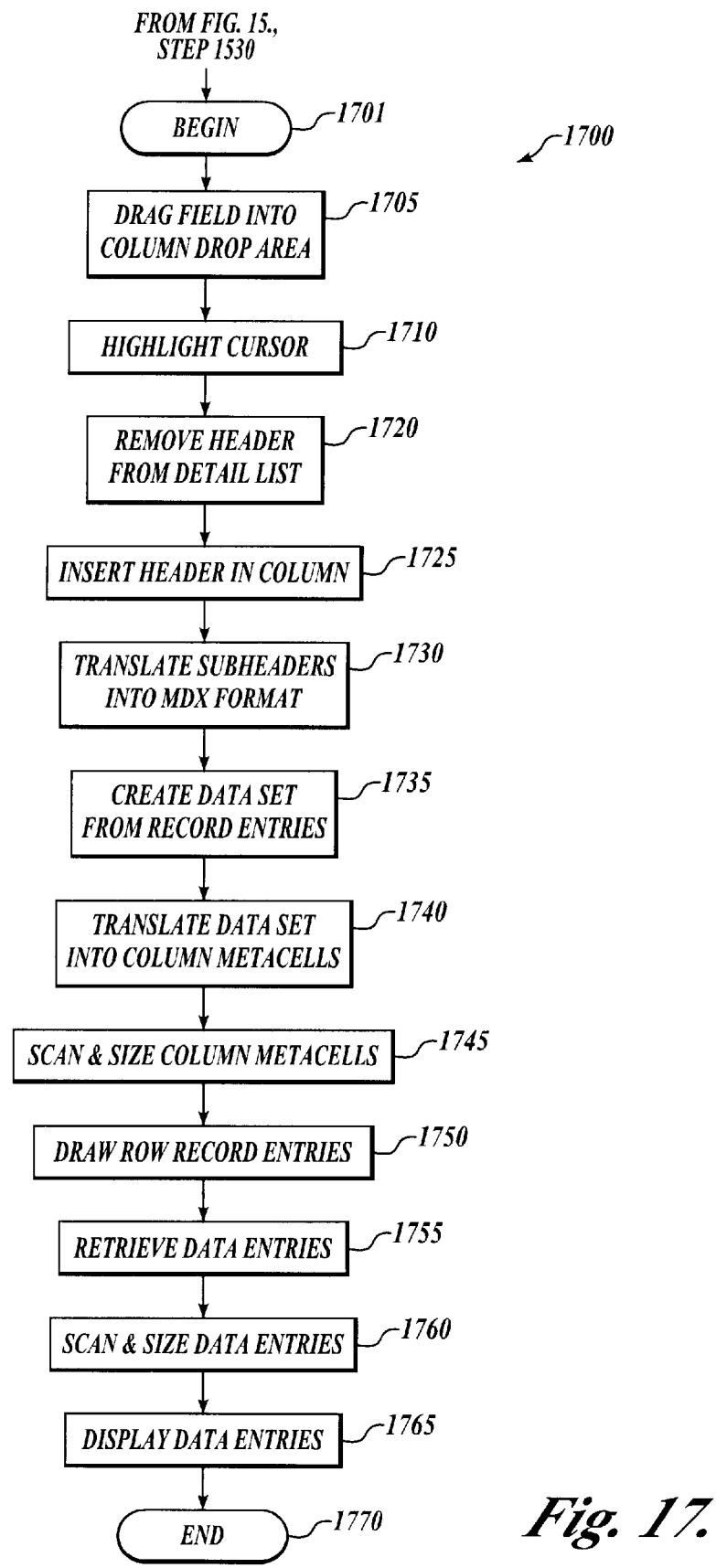
FIG. 17 is a logic flow diagram of a flowchart illustrating a method for updating a database.

FIG. 17 depicts the column group routine 1700. The column group routine 1700 performs logical steps essentially identical to those of the row group routine 1600.

The column group routine 1700 starts with "begin" state 1701, accessed from the "YES" branch of FIG. 15, step 1520. From the "begin" state 1701, step 1705 is entered. In step 1705, the user interface module 200 updates the display device 47 to reflect the heading drag-and-drop operation initiated by the user.

Next, the user interface module 200 changes the shape of the cursor 330 in step 1710 to provide additional feedback to the user that the heading 320 will be added to the row group area 410, as described with respect to FIG. 6. Following step 1710, step 1720 removes the heading 320 from the flat list display 360 of the database 350.

After step 1720, step 1725 is entered. In step 1725, the user interface module 220 instructs the PivotDef module 230 to insert the heading 320 and its subheadings into the column drop area 420, thus defining the number of metacells that will be created. One metacell is created for each subheading. In the event that the database has been grouped by column prior to the column group operation, one metacell is created for each intersection of a column subheading and column subheading.

Once the PivotDef module 230 receives the request to insert the heading 320 and subheadings into the column drop area 420, it translates the subheadings of the heading 320 chosen for the column group operation into a format compatible with the MDAC module 230. In an embodiment, this is the MDX, or Microsoft Database Executable, format. The PivotDef module 230 then executes the user interface module 200 request by passing the subheadings to the MDAC module 230.

Once the MDAC module 230 has received the subheadings, it creates a data set in step 1735. The MDAC module 230 creates a data set by scanning the record entries 310 for the presence or absence of data entries 340 corresponding to the heading 320 that was moved to the column drop area 400 in step 1705. Record entries 310 containing identical data entries 340 corresponding to the moved heading 320 are grouped together. The resulting set of grouped record entries 310 constitutes the data set produced by the MDAC module 230. Once step 1735 is completed, the MDAC module 230 initiates step 1740.

In step 1740 of the column group routine 1600, the MDAC module 230 passes the data set created in step 1735 to the PivotDef module 210. The PivotDef module 210 translates the data set back into record entries 310, now grouped by column according to the heading 320 placed in the column drop area 410. Once translated, step 1745 is entered and the column record entries 310 are passed to the user interface module 200, which scans and sizes them. The user interface module performs this operation on the record entries 310 in order to determine their relative dimensions and allocate adequate space on the display device 47 to accommodate each record entry.

Once the user interface module 200 sizes the record entries 310 located within each metacell, the database utility 100 executes step 1750. In step 1750, the user interface module 200 displays the record entries 310 comprising each metacell on the display device 47. Once the user interface module displays the record entries 310, it must display the data entries 340 comprising the record entries. In step 1755, the user interface module 200 retrieves the data entries 340 for each record entry 310. The data entries are then scanned and sized in step 1760 by the user interface module in a manner similar to the record entry sizing of step 1740. Once properly sized, the user interface module 200 displays the data entries 340 for each record entry 310. Finally, the database utility 100 halts operation in "end" state 1770.

Operation of the Summary Value Operation Routine

Figure 18:
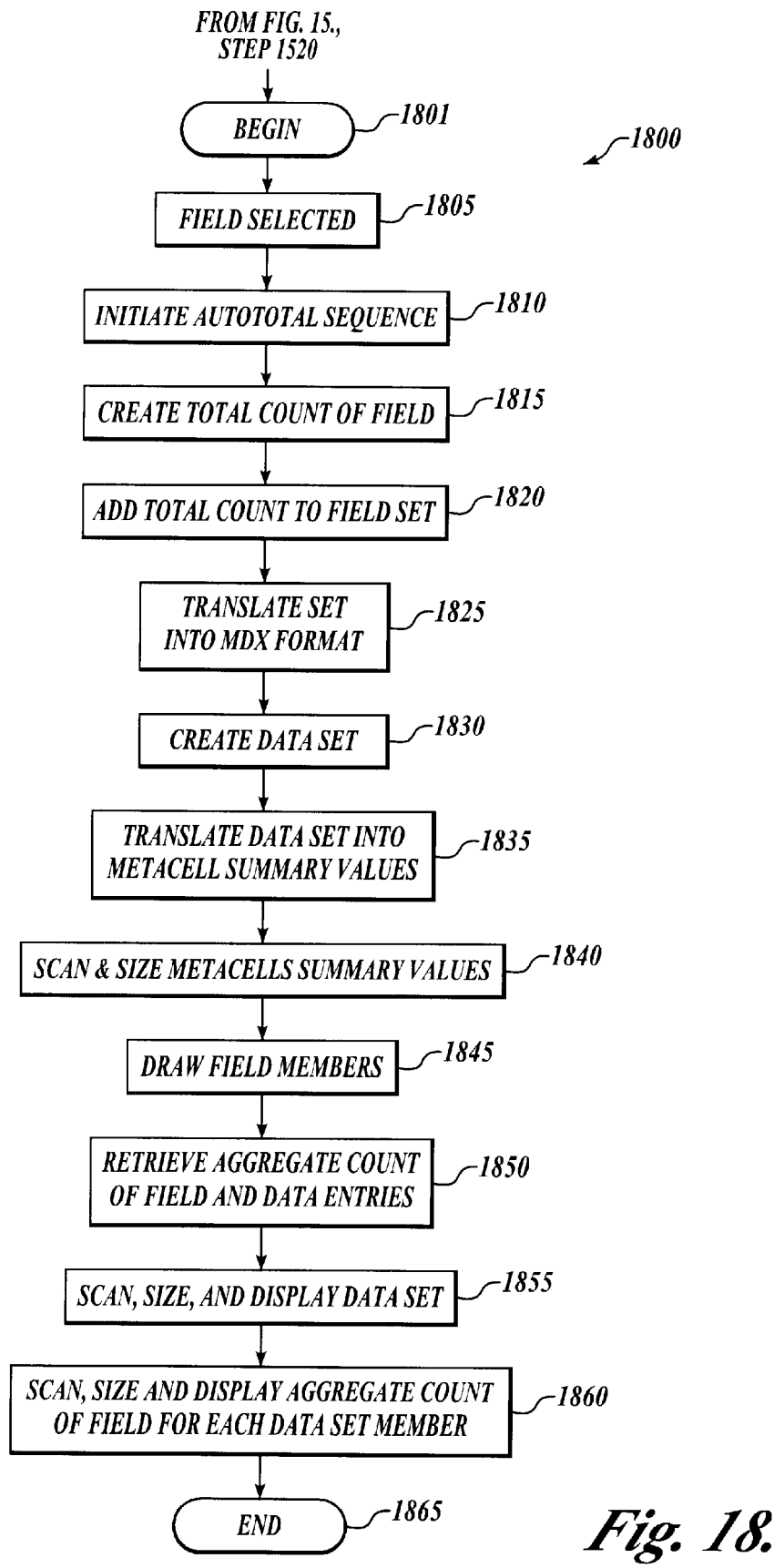
FIG. 18 is a logic flow diagram of a flowchart illustrating a method for updating a database.

FIG. 18 shows the summary value operation routine 1800. The summary value operation routine 1800 is entered from step 1530 of FIG. 15. The routine starts in "begin" state 1801.

In step 1805, the user interface module 200 determines what field has been selected by a user. A "field" represents a column of data. Alternative embodiments may perform summary value operations on single metacells, rows, or columns.

Once the selected field is identified, the user interface module 200 instructs the PivotDef module 210 to initiate the summary value operation sequence in step 1810. The PivotDef module 210 then performs the summary value operation on the selected field in step 1815. Next, the summary value 900 created in step 1815 is added to the field set in step 1820 as an additional data item. That is, the summary value 900 is seen by the PivotDef module 210 along with the record entries 310. As a result, when the field set is translated into MDX format in step 1825 prior to being passed to the MDAC module 230, the translated field set includes an entry corresponding to the summary value 900 generated in step 1815.

Following step 1825, the MDAC module 230 creates a data set from the translated field set in step 1830. This data set is created in a manner similar to that described with respect to step 1635 of FIG. 16. Next, in step 1835 the MDAC module 230 passes the data set to the PivotDef module 210, which in turn translates the data set into metacell summary values. Once translated, step 1840 is entered and the metacell summary values are passed to the user interface module 200, which scans and sizes them. As with the row group routine 1600, the user interface module scans the field entries in order to properly display the field entries on the limited space of the display surface.

Once the user interface module 200 sizes the field entries, the database utility 100 executes step 184, wherein the user interface module 200 displays the record entries 310 comprising each field member on the display device 47. Next, the user interface module 200 retrieves the summary value 900 for each field, along with the data entries 340 comprising the field entries. The data entries 340 are scanned, sized, and displayed by the user interface module 200 in step 1855. Next, each summary value is scanned, sized, and displayed within an associated metacell. Finally, the database utility 100 terminates the summary value routine 1800 by entering "end" state 1860.

Operation of the Metacell Change State Routine

Figure 19:
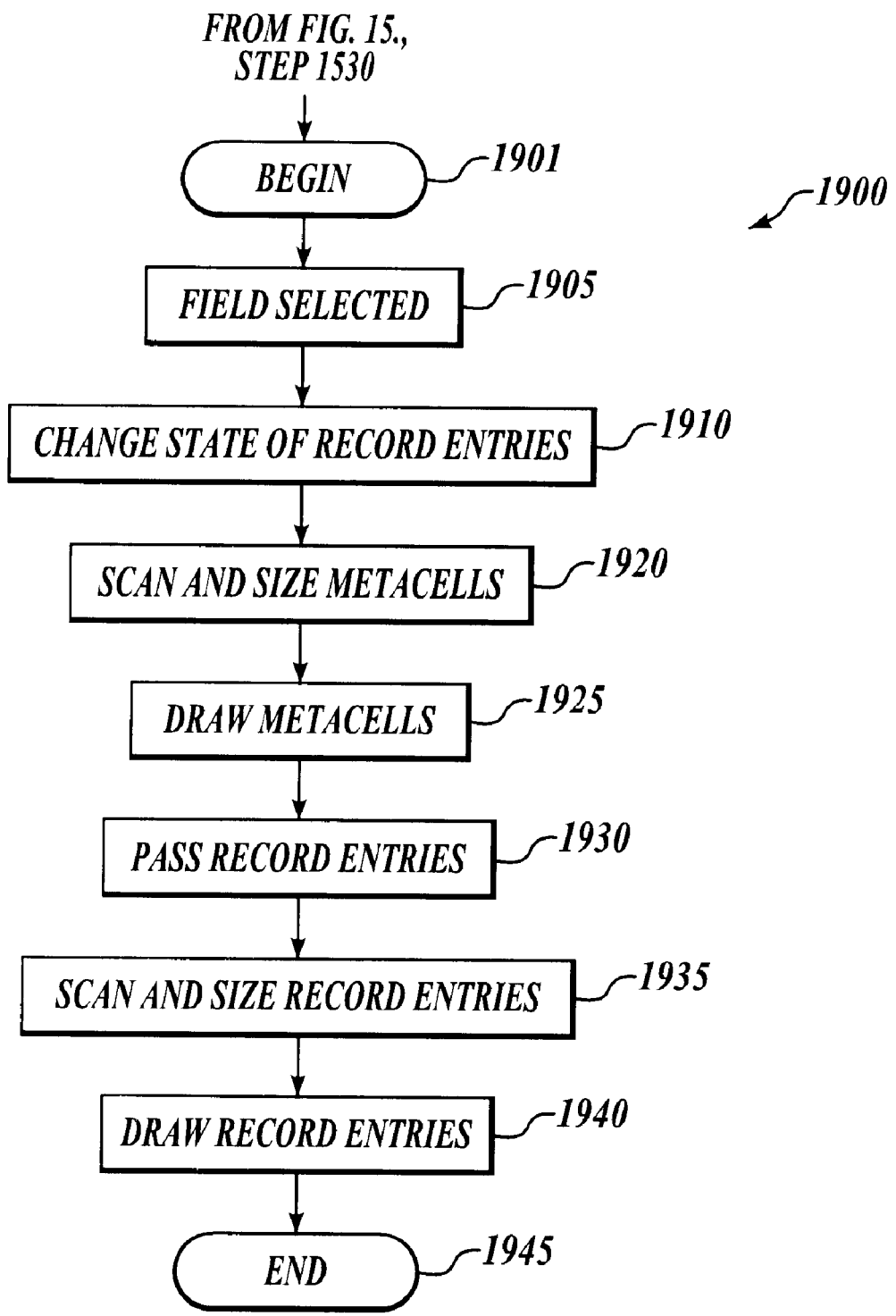
FIG. 19 is a logic flow diagram of a flowchart illustrating a method for updating a database.

FIG. 19 displays the metacell change state routine 1900. The database utility 100 invokes the change state routine 1900 to toggle the display state of a metacell 300 between expanded and collapsed states. Typically, the metacell change state routine 1900 is invoked by a user pressing the change state button 520. The change state routine 1900 starts in "begin" state 1901, entered from step 1540 of FIG. 15.

In step 1905, the field selected by the user in step 1540 of FIG. 15 is identified by the user interface module 200. Once the user interface module 200 has identified the field, it executes step 1910 by changing the state of all record entries 310 within the selected field. In the event that the change state routine 1900 was invoked to collapse a field, the record entry state is toggled from visible to hidden. However, if the change state routine 1900 is used to expand a field, the record entry state changes from hidden to visible.

From step 1910, the change state routine 1900 enters step 1920. The user interface module 200 scans and sizes the metacells 1000 comprising the selected field. Once sized, the user interface module 200 executes step 1925 and draws the metacells on the display device 47 within the display surface.

In step 1925, the user interface module scans and sizes the record entries 310 in order to determine the space to be allocated to each on the display surface.

The user interface module 200 then draws each record entry that will be displayed on the display surface in step 1930. If the change state routine 1900 changes the state of a field from expanded to collapsed, then only the summary value is drawn in step 1930. Alternately, all record entries are drawn if the field has been expanded. After step 1930, the change state routine 1900 halts in "end" state 1935.

Conclusion

The database utility 100 may include additional functionality, for example, allowing the user to execute summary commands in addition to those listed. The utility 100 may also accept inputs from other input sources beyond those listed, including alternate input devices or control signals from different programs. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

What is claimed is:

1. A method for grouping and displaying a database, comprising the steps of:
   retrieving a database file comprising a plurality of headings and plurality of data entries organized under the headings;
   displaying the database on a display device;
   displaying a drop area on the display device;
   in response to a command associating a first one of the headings with the drop area, grouping the database into a plurality of metacells according to the first heading, each metacell comprising one or more data entries having a common data entry corresponding to the first heading; and
   displaying the metacells on the display device.

2. The method of claim 1, wherein:
   the drop area is a row drop area;
   the database is grouped by row according to the first heading;
   the metacells are row metacells; and
   the row metacells are displayed on the display device.

3. The method of claim 2, wherein the command is a first user command, and further comprising the steps of:
   displaying a column drop area on the display device;
   in response to a second user command associating a second one of the headings with the column drop area, grouping the database by column into a plurality of dual-grouped metacells according to the second heading, each dual-grouped metacell comprising one or more common data entries corresponding to the first and second headings; and
   displaying the dual-grouped metacells on the display device.

4. The method of claim 3, wherein:
   the row drop area appears as a column displayed adjacent to a first edge of the database; and
   the column drop area appears as a row displayed adjacent to a second edge of the database.

5. The method of claim 4, wherein:
   the user command associating the first heading with the row drop area comprises a drag-and-drop command selecting the first beading and dropping the fist heading on the row drop area; and
   the user command associating the second heading with the column drop area comprises a drag-and-drop command selecting the second heading and dropping the second heading on the column drop area.

6. The method of claim 3, further comprising the steps of:
   in response to receiving a third user command, performing an operation on the dual-grouped metacells by row and column; and
   displaying an operation result in association with each metacell.

7. The method of claim 6, wherein the operation result for each metacell is displayed along a bottom edge of the metacell.

8. The method of claim 6, wherein the operation is selected from the group comprising:
   summing numeric data entries within the metacell;
   counting the number of data entries within the metacell;
   determining a maximum value for numeric data entries within the metacell; and
   determining a minimum value for numeric data entries within the metacell.

9. The method of claim 6, further comprising the steps of:
   receiving a collapse display user command; and
   for each metacell, displaying only a corresponding operation result within the metacell.

10. The method of claim 6, further comprising the steps of:
    receiving an expand display user command; and
    for each metacell, displaying the corresponding data entries and the corresponding operation result within the metacell.

11. A computer storage medium storing computer-executable instructions for performing the method of claim 6.

12. A computer configured for performing the method of claim 6.

13. The method of claim 1, wherein:
    the drop area is a column drop area;
    the database is grouped by column according to the first heading;
    the metacells are column metacells; and
    the column metacells are displayed on the display device.

14. The method of claim 1, wherein the database is displayed in a single display surface on the display device, and the metacells are displayed in multiple surfaces on the display device.

15. The method of claim 1, wherein the database is displayed in the active window of an HTML-enabled web browser.

16. A computer storage medium storing computer-executable instructions for performing the method of claim 1.

17. A computer configured for performing the method of claim 1.

18. A method for grouping and displaying a database, comprising the steps of:
    retrieving a database file comprising a plurality of headings and plurality of data entries organized under the headings;
    displaying the database on a display device;
    displaying a row drop area adjacent to a first edge of the database on the display device;
    in response to a first user command associating a first one of the headings with the row drop area, grouping the database into a plurality of metacells according to the first heading, each metacell comprising one or more data entries having a common data entry corresponding to the first heading;

displaying a column drop area adjacent to a second edge of the database on the display device;

in response to a second user command associating a second one of the headings with the column drop area, grouping the database by column into a plurality of dual-grouped metacells according to the second heading, each dual-grouped metacell comprising one or more common data entries corresponding to the first and second headings;

displaying the dual-grouped metacells on the display device;

in response to receiving a third user command, performing an operation on the dual-grouped metacells by row and column; and displaying an operation result in association with each metacell.

19. The method of claim 18, wherein the database is displayed in a web browser on the display device.

20. A computer storage medium storing computer-executable instructions for performing the method of claim 18.

21. A computer configured for performing the method of claim 18.

22. A method for grouping and displaying a database, comprising the steps of:

retrieving a database file comprising a plurality of headings and plurality of data entries organized under the headings;

displaying the database on a display device;

displaying a drop area on the display device;

in response to a first user command associating a first one of the headings with the drop area, grouping the database into a plurality of metacells according to the first heading, each metacell comprising one or more data entries having a common data entry corresponding to the first heading;

displaying the metacells on the display device;

in response to a second user command, determining whether the second user command comprises a collapse display user command;

in response to determining the second user command comprises a collapse display user command, for each metacell associated with the command, displaying only a corresponding operation result within the metacell; and in response to determining the second user command comprises an expand display user command, for each metacell associated with the command, displaying the corresponding data entries and the corresponding operation result within the metacell.

23. A computer storage medium storing computer-executable instructions for performing the method of claim 22.

24. A computer configured for perforating the method of claim 22.

25. A method for grouping and displaying a database, comprising the steps of:

retrieving a database file comprising a plurality of headings and plurality of data entries organized under the headings;

displaying the database on a display device;

displaying a column drop area on the display device;

dragging-and-dropping a first one of the headings onto the column drop area;

grouping the database into a plurality of metacells according to the first heading, each metacell comprising one or more data entries having a common data entry corresponding to the first heading, wherein the grouping is performed in response to the dragging-and-dropping the first one of the headings onto the column drop area; and displaying the metacells on the display device.

* * * * *